United States Patent [19]

Mehl

[11] Patent Number: 4,523,267
[45] Date of Patent: Jun. 11, 1985

[54] POWER CONVERTER CONTROL CIRCUIT

[75] Inventor: Byron R. Mehl, Belvidere, Ill.

[73] Assignee: Sundstrand Corporation, Rockford, Ill.

[21] Appl. No.: 560,888

[22] Filed: Dec. 14, 1983

[51] Int. Cl.³ .................... H02P 13/20; H02P 13/26
[52] U.S. Cl. ...................................... 363/87; 363/98; 363/129; 363/132; 363/136
[58] Field of Search .................... 363/84, 85, 86, 87, 363/129, 132, 136, 96, 97, 98; 323/242, 243, 326; 318/799, 800, 801; 307/129, 140

[56] References Cited

U.S. PATENT DOCUMENTS

| 3,351,838 | 11/1967 | Hunter . | |
|---|---|---|---|
| 3,483,613 | 12/1969 | Malcolm et al. | 318/437 |
| 3,836,839 | 9/1974 | Becky . | |
| 3,935,520 | 1/1976 | Johnson | 318/326 |
| 3,986,047 | 10/1976 | Griess . | |
| 4,044,295 | 8/1977 | Ferraiolo et al. . | |
| 4,152,758 | 5/1979 | Bailey et al. . | |
| 4,262,256 | 4/1981 | Blais et al. . | |
| 4,394,723 | 7/1983 | Hoffman | 363/87 |

FOREIGN PATENT DOCUMENTS

| 2438374 | 6/1980 | France | 363/87 |
|---|---|---|---|
| 928609 | 5/1982 | U.S.S.R. | 363/87 |
| 980243 | 12/1982 | U.S.S.R. | 363/87 |

OTHER PUBLICATIONS

IEEE Transactions of Industrial Electronics and Control Instrumentation, vol. IECI-26, No. 3, Aug. 1979, pp. 185-191.

Primary Examiner—Peter S. Wong
Assistant Examiner—Judson H. Jones
Attorney, Agent, or Firm—Wood, Dalton, Phillips, Mason & Rowe

[57] ABSTRACT

A control circuit for a power converter which converts between polyphase periodic power and unidirectional power is disclosed. The control circuit includes first means for sensing a parameter of the periodic power and a ramp generator coupled to the first means for generating a ramp signal having a frequency equal to the frequency of the periodic power. A second means senses a parameter representative of a condition at the output of the power converter and a comparator combines the outputs from the ramp generator and the second means to generate a pulse train having a frequency equal to the frequency of the periodic power but shifted in time relative thereto, with the shift being dependent upon the output parameter. A phase-locked loop, of PLL, multiplies the frequency of the pulse train and additionally develops a signal which is coupled to the ramp generator to maintain the amplitude of the output therefrom at a constant level irrespective of changes in frequency of the periodic power. Multi-phase logic is coupled to the PLL and develops switching signals for switches in the converter.

15 Claims, 5 Drawing Figures

POWER CONVERTER CONTROL CIRCUIT

BACKGROUND OF THE INVENTION

The present invention relates generally to power converters, and more particularly to a control circuit for a phase-controlled rectifier or for an inverter.

One prior type of control circuit for a power converter is disclosed in Bailey et al U.S. Pat. No. 4,152,758. This patent discloses a control for a phase-controlled rectifier system for converting single-phase AC power into DC power. The control includes controlled rectifiers which are operated by switching signals generated in part by a ramp generator synchronized to an AC input waveform, with the ramp signal from the ramp generator being compared with a reference signal. The reference signal is disclosed as being an error voltage representing the difference between a desired voltage at the output of the rectifier and a commanded voltage.

Griess U.S. Pat. No. 3,986,047 discloses circuitry for generating switching signals for a phase-controlled regulator. Multiple ramp generators, one for each phase, generate ramp signals, each of which is compared with an error voltage to produce gating signals for a controlled rectifier.

A control system for controlling switches in a polyphase inverter is disclosed in Glennon Ser. No. 534,170, filed Sept. 19, 1983, and assigned to the assignee of the instant application. This control system utilizes a single pulse width modulator which generates a pulse width modulation waveform. This waveform is coupled to three-phase logic circuitry for developing switching signals for switches in the polyphase inverter. The pulse width modulator receives a triangle wave and an error signal, with the pulse width modulation waveform being a function of the level of the error signal and the frequency of the triangle wave.

SUMMARY OF THE INVENTION

In accordance with the present invention, a control circuit for a power converter which converts between polyphase periodic power and unidirectional power includes a single ramp generator and comparator for developing a pulse train which is coupled to a phase-locked loop, or PLL, to drive switching signals for switches in the converter. A parameter of the periodic power is sensed and is coupled to the ramp generator such that the ramp signal output therefrom has a frequency equal to the frequency of the periodic power. A second parameter representative of a condition at the output of the power converter is sensed and is coupled to the comparator, where it is combined with the ramp generator output to generate the pulse train having a frequency equal to the frequency of the periodic power but shifted in time relative thereto, with the shift being dependent upon the output parameter.

The PLL is coupled to the comparator and to the ramp generator to develop a PLL signal whose frequency is equal to n times the frequency of the pulse train. The PLL also includes means for generating a DC signal representing the frequency of the PLL signal, the DC signal being connected back to the ramp generator to maintain the amplitude of the ramp signal constant when the frequency of the periodic power varies. Multi-phase logic receives the output of the PLL and develops switching signals for switches in the converter from the PLL signal.

The PLL synchronizes or coordinates the operation of the multi-phase logic with the ramp generator so that separate ramp generator and comparator circuits are not required for each phase of the periodic power. This assures that the points in time at which switches in the converter are operated are accurately controlled, even in the event of a shift in frequency of the periodic power.

DESCRIPTION OF THE PREFERRED EMBODIMENT

Figure 1:
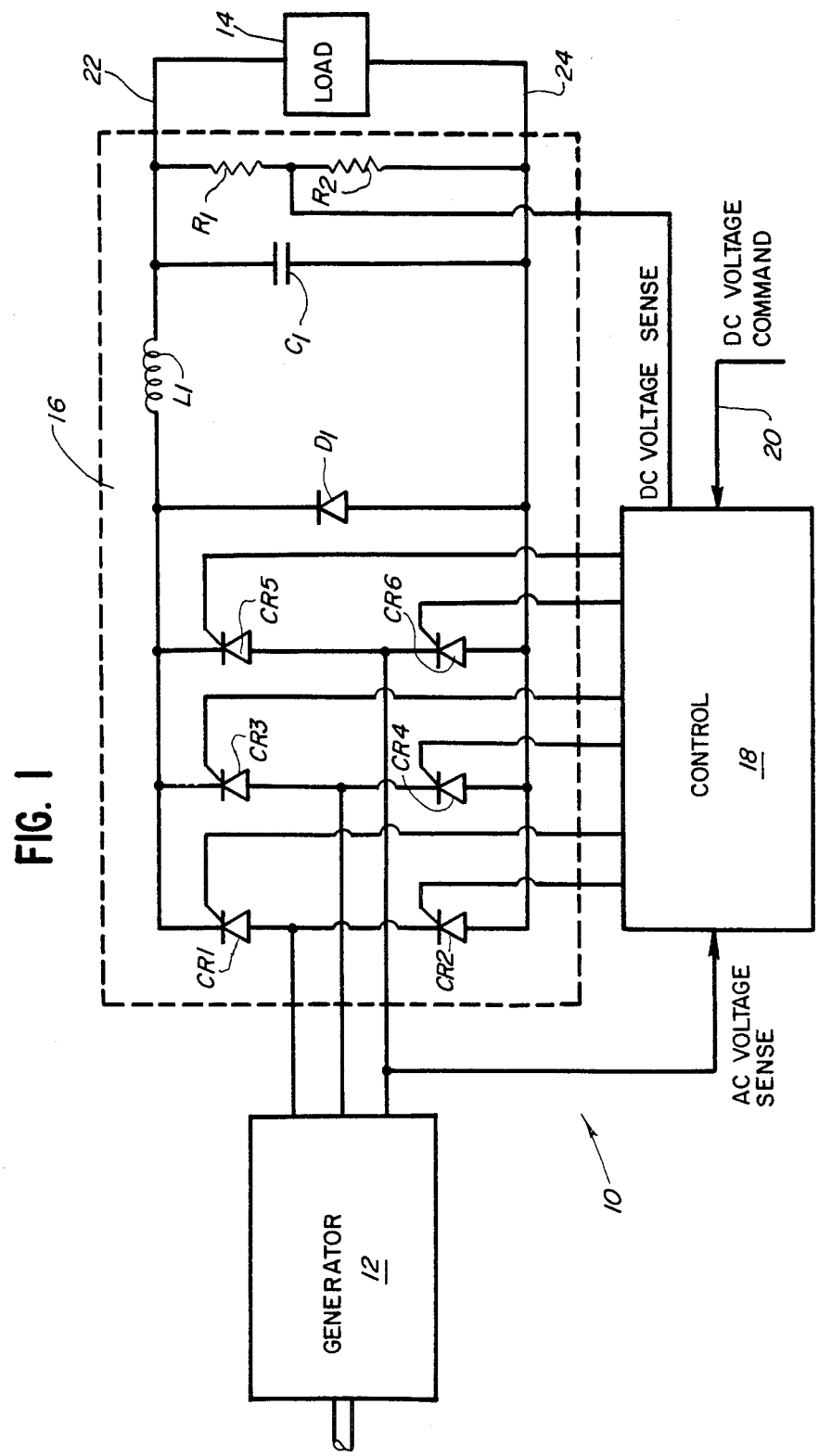
FIG. 1 is a block diagram of a phase-controlled regulator incorporating a control according to the present invention.

Referring now to FIG. 1, there is illustrated a phase-controlled regulator system 10 which converts polyphase periodic or AC power from a generator 12 into unidirectional or DC power to energize a load 14. The conversion function is accomplished by a rectifier circuit 16 which is operated by a control circuit 18 according to the present invention. The control circuit 18 operates a plurality of switches in the rectifier circuit 16 in accordance with a sensed parameter of the periodic power, a sensed parameter representative of a condition at the output of the rectifier circuit 16 and a selectable command signal over a line 20. Specifically, the control 18 senses the voltage of one phase of the generator output and the voltage at the output of the rectifier circuit 16 and operates the switches at appropriate points in the respective phases of the AC waveform to maintain the output voltage at the commanded value as selected over the line 20.

The switches in the rectifier circuit 16 comprise controlled rectifiers CR1–CR6 which are connected in a conventional bridge-type topology. An inductor L1 and a capacitor C1 filter the output of the rectifier circuit 16 in a conventional manner. The output voltage of the rectifier circuit 16 is sensed at a junction between two resistors R1 and R2 connected serially across output lines 22 and 24 of the circuit 16.

Figure 2:
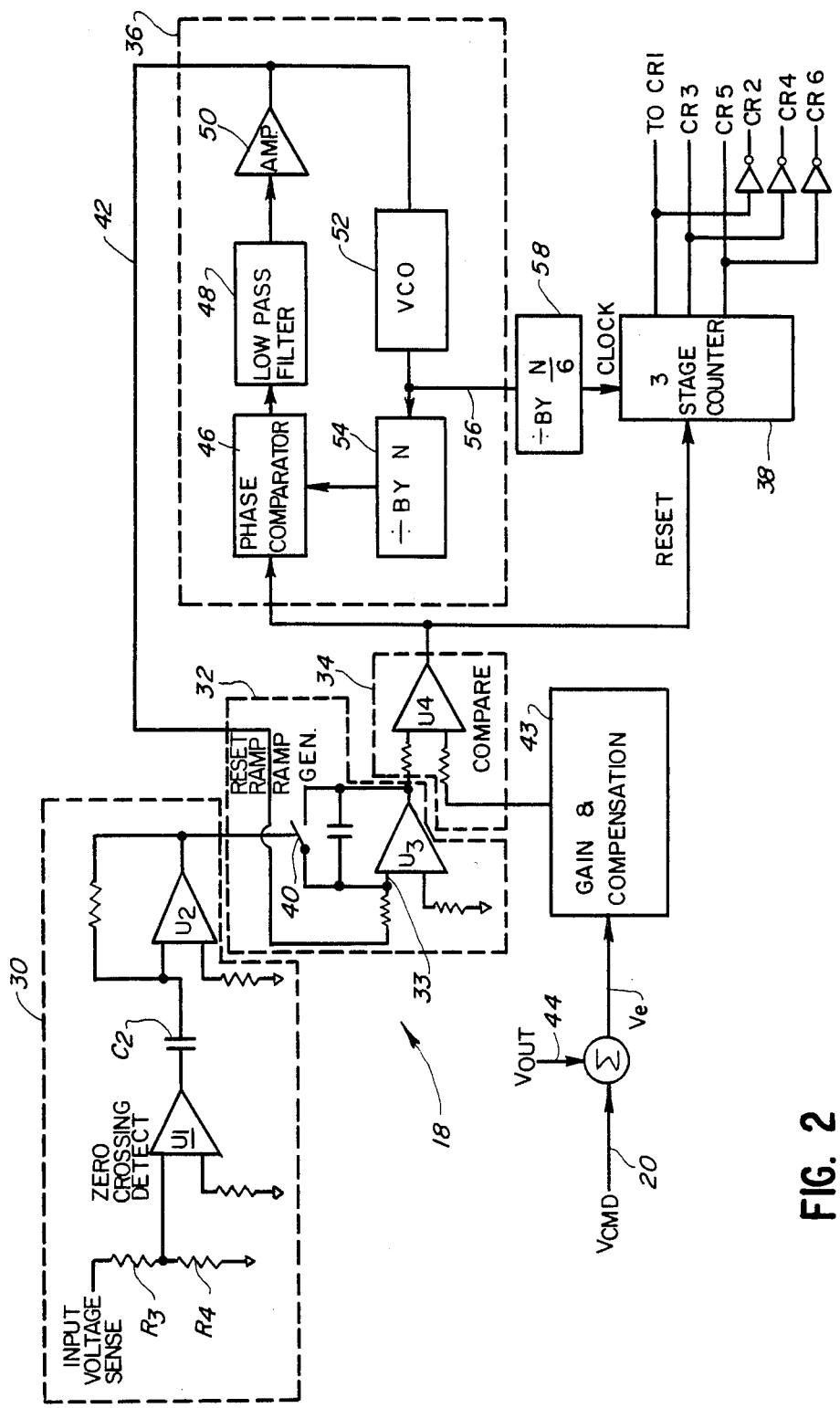
FIG. 2 is a detailed block diagram of the control circuit shown in block diagram form in FIG. 1.

Referring now to FIG. 2, the control circuit 18 generally includes a zero crossing detector 30, a ramp generator 32, a comparator 34, a phase-locked loop, or PLL 36 and multi-phase logic in the form of a three-stage counter 38.

It should be noted that the present invention is not limited to three-phase power conversion control, but may be utilized to control conversion of n-phase periodic power. In such a case, 2n switches would be operated by the control circuit 18 by replacing the three-stage counter 38 with an n-stage counter.

Figure 5:
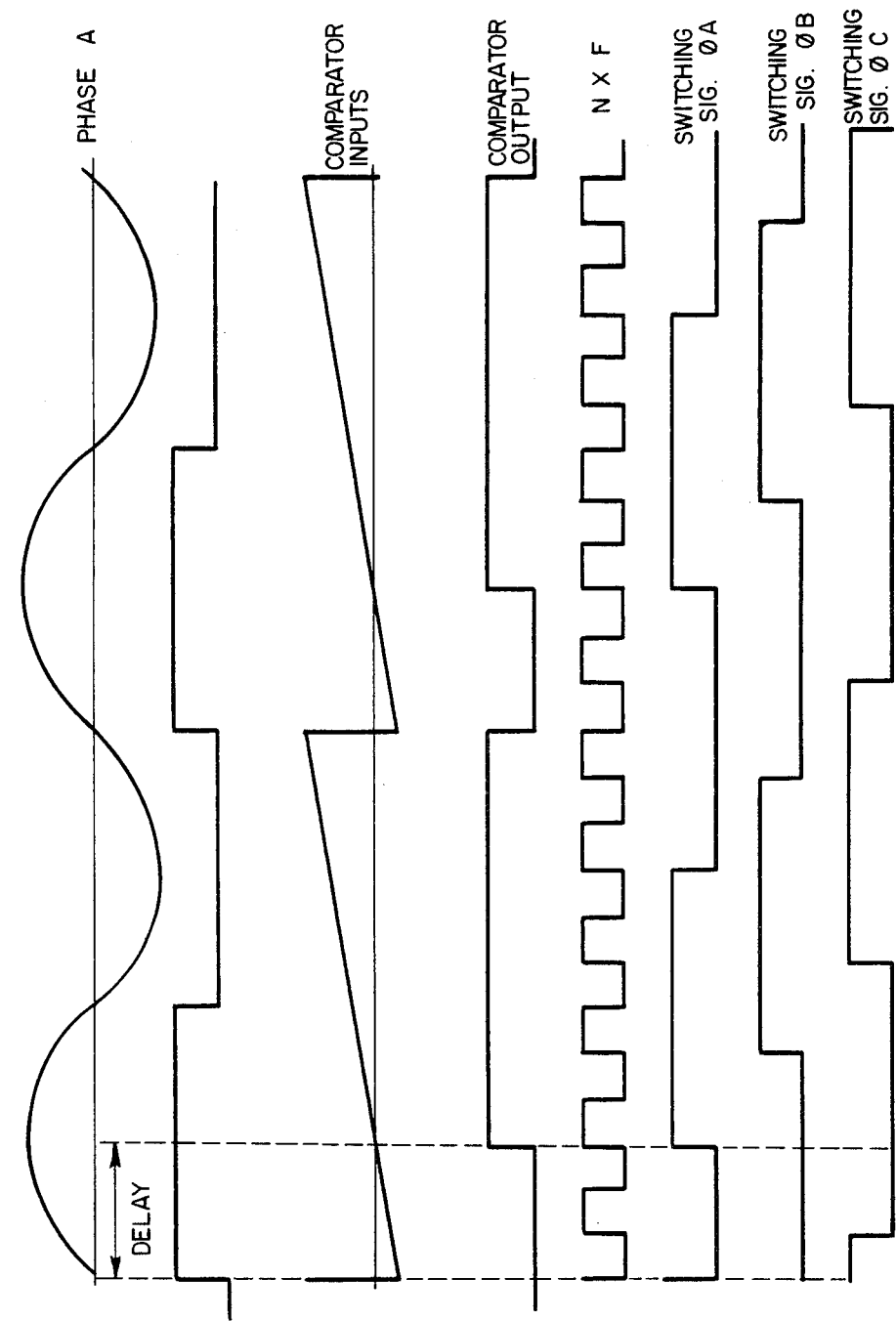
FIG. 5 is a series of waveform diagrams illustrating the operation of the control circuit of the present invention.

Two resistors R3 and R4 are connected to one phase of the AC output. A junction between the two resistors R3 and R4 is coupled to an operational amplifier, or op amp U1. The output from the op amp U1 is coupled through a capacitor C2 to a second op amp U2 which functions as a squaring amplifier. The output of op amp U2 is coupled to an electronic switch, illustrated schematically at 40 in the ramp generator circuit 32. Referring also to FIG. 5, the zero crossing detector 30 develops a square wave which has a frequency equal to the frequency of the AC power from the generator 12.

The ramp generator 32 includes an op amp U3 which is connected in an integrator configuration. The ramp generator 32 includes an integrating input 33 which receives a DC voltage over a line 42 from the PLL 36. The level of the DC voltage on the line 42 is representative of the frequency of the output from the PLL 36. The ramp generator 32 integrates the DC voltage on the line 42 until a leading edge of the square wave from the zero crossing detector resets the ramp generator, as seen in FIG. 5. The output from the ramp generator 32 is coupled to one input of an op amp U4 which functions as the comparator 34.

The other input to the comparator 34 is from a gain and compensation circuit which in turn receives an error voltage representing the difference between the voltage at the output of the regulator over a line 44 and the commanded voltage over the line 20.

The comparator 34 combines the outputs from the ramp generator 32 and the gain and compensation circuit 43 to generate a time-varying signal or pulse train having a frequency equal to the frequency of the periodic power from the generator 12 but shifted in time relative thereto, with the shift being dependent upon the level of the DC output voltage from the regulator system. As seen in FIG. 5, the comparator output is in a high state when the ramp signal level exceeds the level of the signal from the gain and compensation circuit 43 and is in a low state when the ramp signal level is less than the level from the gain and compensation circuit 43.

The output from the comparator 34 is coupled to a phase comparator 46 in the PLL 36 and is coupled to a reset input of the three-stage counter 38.

The PLL 36 multiplies the frequency of the signal from the comparator 34 by a factor N. The PLL 36 includes the phase comparator 46 previously mentioned, a low pass filter 48, an amplifier 50, a voltage controlled oscillator, or VCO 52 and a divide-by-N circuit 54, all of which are connected in a conventional configuration to develop a highly stable frequency-multiplied PLL signal on a line 56.

The output of the amplifier 50 is a DC signal, the level of which is representative of the frequency of the signal on the output line 56. As previously noted, this DC level is integrated by the ramp generator 32. Since it is possible that the output of the generator 12 may vary in frequency, it is important that this shift in frequency not vary the amplitude of the ramp generator output, i.e. the time delay should only be a function of the output of the gain and compensation circuit 43 and not a function of frequency. This control over the time delay is maintained by the DC signal on the line 42, which maintains the ramp generator output signal amplitude at a constant value irrespective of frequency shifts.

As previously noted, the output from the PLL 36 on the line 56 has a frequency equal to N times the frequency of the output of the comparator 34. This signal is coupled to a divide-by-N/6 circuit 58 which reduces the frequency of the signal on the line 56 by a factor of N/6. This signal is then coupled to a clock input of the three-stage counter 38.

The three-stage counter develops switching signals from the output of the divider circuit 58 to gate the SCR's in the rectifier circuit 16. The switching signals have a predetermined delay relative to the AC input waveform as seen in FIG. 5.

Figure 3:
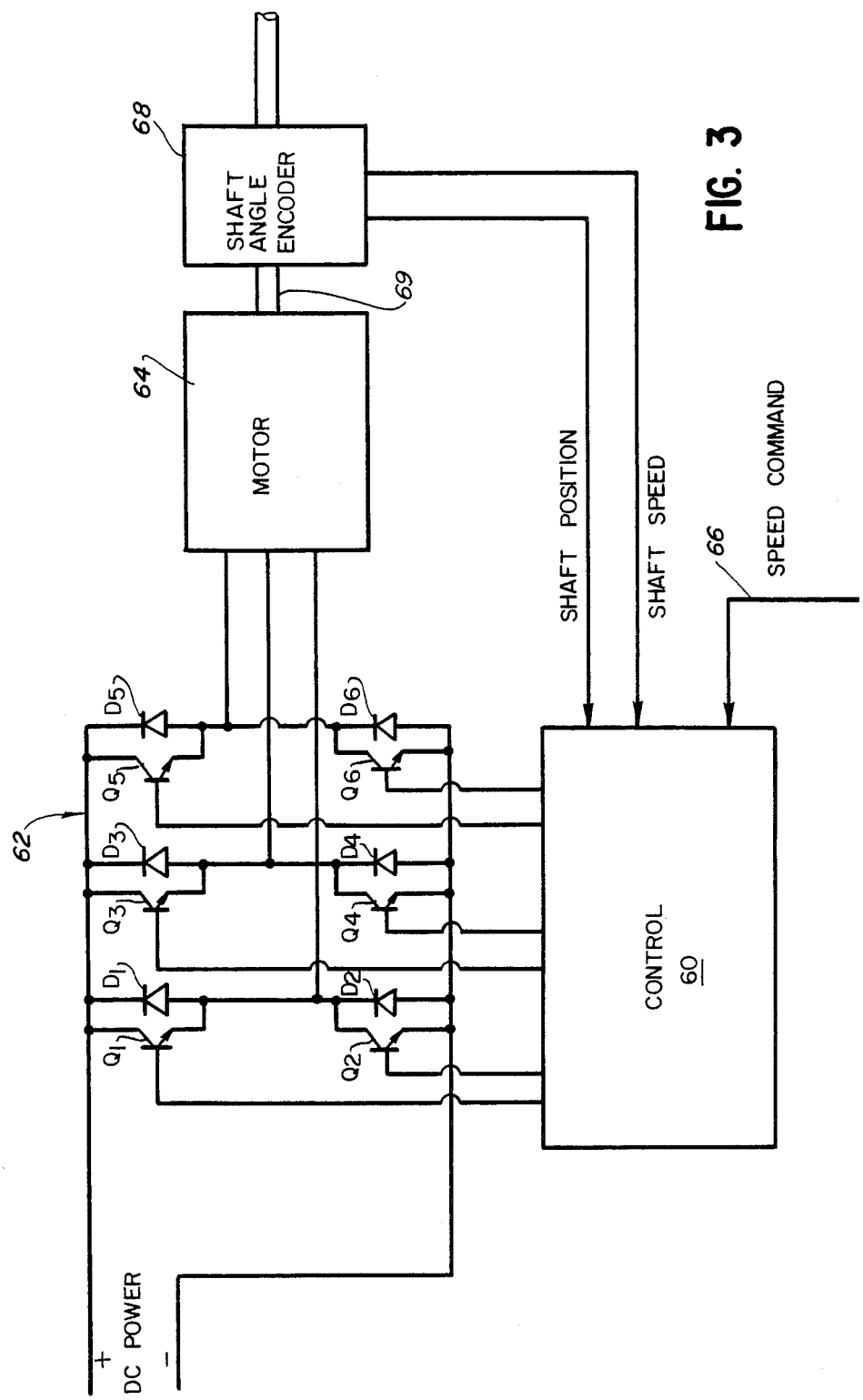
FIG. 3 is a system block diagram of an inverter motor control system incorporating a control circuit according to the present invention.

Referring now to FIG. 3, a control circuit 60 according to the present invention may alternatively be employed to develop switching signals for switches in an inverter 62 which converts DC or unidirectional power into AC or periodic power to drive a load, such as a motor 64. The control 60 shown in FIG. 3 is similar to the control 18 discussed above with the exception that the control 60 operates the switches in the inverter 62 in response to different parameters.

The control 60 receives a speed command signal over a line 66 representing the desired speed of the motor 64. The control 60 also receives outputs from a shaft angle encoder or resolver 68. One output from the encoder 68 represents a parameter of the periodic power, such as the position of an output shaft 69 of the motor 64, and another output of the encoder 68 represents a condition at the output of the power converter, such as the speed of the shaft 69.

The inverter 62 includes six switches Q1–Q6 which may be power transistors each having an associated freewheeling diode D1–D6, respectively, connected across the collector-emitter circuit thereof.

It should be noted that the switches Q1–Q6 may be replaced by silicon controlled rectifiers, in which case appropriate gating and commutating circuitry may be required.

Figure 4:
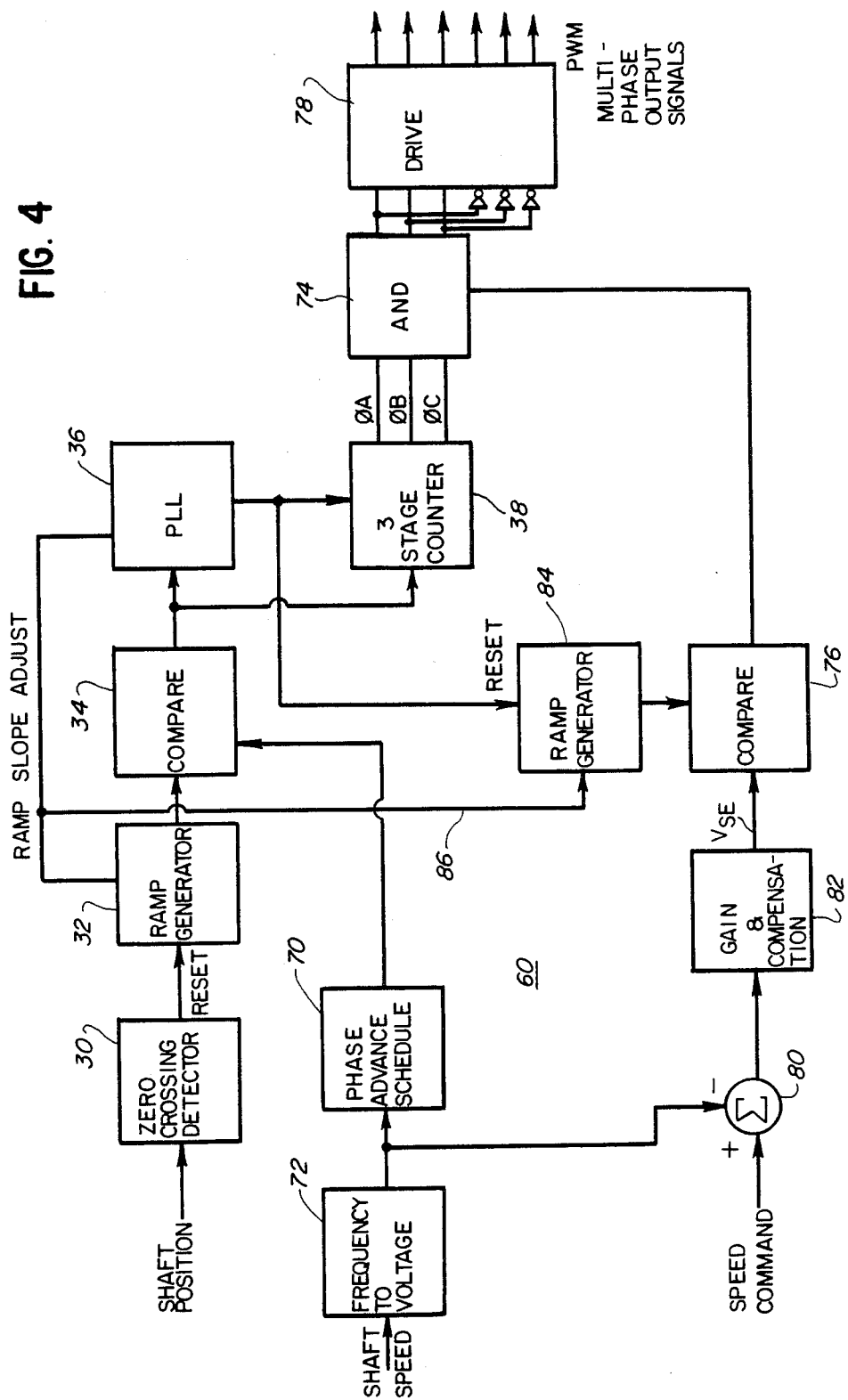
FIG. 4 is a detailed block diagram of the control circuit shown in block diagram form in FIG. 3.

Referring now to FIG. 4, the control 60 includes the zero crossing detector 30, the ramp generator 32, the comparator 34, the PLL 36 and the three-stage counter 38, all substantially identical to those shown in FIG. 2. The zero crossing detector receives the shaft position signal from the shaft angle encoder 68 shown in FIG. 3. As previously noted, the ramp generator 32 forms one input for the comparator 34. The other input to the comparator 34 is a DC signal from a phase advance schedule circuit 70. The phase advance schedule circuit 70 receives a DC level representing motor shaft speed from a frequency-to-voltage converter 72 and develops an output signal representing the optimal phase advance angle for operation of the motor at the desired speed.

The just-described circuitry operates identically to that described in connection with FIGS. 2 and 5, with three phase outputs being developed at the output of the three-stage counter 38. These signals are connected to an AND circuit 74 where they are combined with modulation signals from a second comparator 76. The outputs from the AND circuit 74, along with inverted versions of these outputs, are connected to a drive circuit 78 which amplifies the signals and couples them to the switches Q1–Q6.

The modulation signal from the comparator 76 is derived by comparing a speed error signal $V_{se}$, derived from a summing junction 80 and a gain and compensation circuit 82, with a ramp signal from a ramp generator 84. The ramp generator 84 includes a reset input which receives the PLL output signal having a frequency of N times the motor frequency. The ramp generator 84 also includes an integrating input which receives the DC signal representing PLL output frequency over a line 86. The DC signal maintains the amplitude of the ramp signal constant during speed or frequency variations of the motor 64. The PLL 36 therefore coordinates the ramp generators 32 and 84 with the three-stage counter 38, as previously noted.

In either of the embodiments of FIGS. 2 and 4, the power converter control circuit includes only one or two ramp generators and comparators and not a plurality of such ramp generators and comparators, one for each phase of periodic power. The PLL coordinates the operation of the ramp generator with the multi-phase logic to provide accurate control over the points in time at which the switches in the converter are operated.

I claim:

1. In a power converter for converting between polyphase periodic power and unidirectional power having a plurality of controllable switches, an improved means for controlling the switches, comprising:
   first means for sensing a parameter of the periodic power;
   a ramp generator coupled to the first means for generating a ramp signal having a frequency equal to the frequency of the periodic power;
   second means for sensing a parameter representative of a condition at the output of the power converter;
   means coupled to the ramp generator and to the second means for combining the outputs therefrom to generate a time-varying signal having a frequency equal to the frequency of the periodic power but shifted in time relative thereto, with the shift being dependent upon the output parameter;
   a phase-locked loop coupled to the combining means for developing a PLL signal whose frequency is a multiple of the frequency of the time-varying signal, the phase-locked loop having means for generating a DC signal representing the frequency of the PLL signal, the DC signal being coupled to the ramp generator to vary the slope of the ramp signal; and
   multi-phase logic means coupled between the phase-locked loop and the switches for operating the switches in accordance with the PLL signal.

2. The improved control means of claim 1, wherein the power converter is a phase-controlled regulator for converting polyphase AC power into DC power and wherein the first means includes means for sensing the voltage of one of the AC phases.

3. The improved control means of claim 2, wherein the second means includes means for sensing the voltage at the output of the regulator.

4. The improved control means of claim 1, wherein the combining means comprises a comparator for comparing the ramp signal with an error signal derived from the output of the second means.

5. The improved control means of claim 1, wherein the power converter is an inverter which converts DC power into polyphase AC power to energize a motor having an output shaft, and wherein the first means includes means for sensing the position of the output shaft.

6. The improved control means of claim 5, wherein the second means includes means for sensing the speed of the output shaft.

7. The improved control means of claim 1, further including a zero crossing detector coupled between the first means and the ramp generator for developing a square wave having a frequency equal to the frequency of the periodic power.

8. A control for a power converter for converting between polyphase periodic power and unidirectional power, comprising:
   a ramp generator for developing a ramp signal from the periodic power;
   a comparator for comparing the ramp signal with a DC level to derive a pulse train;
   multi-phase logic for generating switching signals for switches in the converter; and
   a phase-locked loop, or PLL, coupled between the comparator and the multi-phase logic for multiplying the frequency of the pulse train including means for generating a frequency signal representing the frequency of the PLL output and means for coupling the frequency signal back to the ramp generator so that the amplitude of the ramp signal remains constant with changes in frequency of the periodic power.

9. The control of claim 8, further including a zero crossing detector coupled to the periodic power for generating a square wave having a frequency equal to the frequency of the periodic power, the square wave being coupled to the ramp generator.

10. The control of claim 9, wherein the ramp generator includes a reset input which receives the square wave and an integrating input which receives the frequency signal.

11. The control of claim 8 wherein the multi-phase logic comprises a three-stage counter having a clock input connected to the PLL output and a reset input connected to the comparator output.

,15
12. The control of claim 8, wherein the power converter is a phase-controlled regulator for converting polyphase AC power into DC power and further including first means coupled to the ramp generator for sensing the voltage of one of the AC phases.

13. The control of claim 12, further including second means coupled to the comparator for sensing the voltage at the output of the regulator and for developing the DC level in accordance with the sensed voltage.

14. The control of claim 8, wherein the power converter is an inverter which converts DC power into polyphase AC power to energize a motor having an output shaft, and further including first means coupled to the ramp generator for sensing motor shaft position.

15. The control of claim 14, further including second means coupled to the comparator for sensing motor shaft speed and for developing the DC level in accordance with the sensed shaft speed.

* * * * *